United States Patent [19]

McAnespie et al.

[11] 4,329,328

[45] May 11, 1982

[54] METHOD OF SYNTHESIZING ZINCOSILICATE OR STANNOSILICATE OR TITANOSILICATE MATERIAL

[75] Inventors: Patrick McAnespie, Redcar; Alan Dyer, Manchester; Bharati J. Mehta, Rochdale, all of England

[73] Assignee: National Research Development Corporation, London, England

[21] Appl. No.: 197,021

[22] Filed: Oct. 16, 1980

[30] Foreign Application Priority Data

Oct. 19, 1979 [GB] United Kingdom ................. 7936348

[51] Int. Cl.$^3$ ....................... C01B 33/20; C01B 33/32
[52] U.S. Cl. ................................ 423/333; 106/288 B; 106/292; 106/299; 252/454; 252/457; 252/174.25; 423/326; 423/332
[58] Field of Search ...................... 423/333, 332, 326; 106/288 B, 292, 299; 252/454, 457, 89.1, 135, 174.25

[56] References Cited

U.S. PATENT DOCUMENTS 1,728,732  9/1929  Jaeger .............................. 252/454 X
3,329,481  7/1967  Young ................................. 423/333
4,071,377  1/1978  Schwuger et al. ......... 252/174.25 X

*Primary Examiner*—Edward J. Meros
*Attorney, Agent, or Firm*—Oblon, Fisher, Spivak, McClelland & Maier

[57] ABSTRACT

Sodium zinco/stanno/titano-silicate is synthesized by mixing a concentrated aqueous sodium zincate, stannate or titanate solution with a source of silica (e.g. powdered glass or sodium metasilicate solution) in the ratio 60 g sodium silicate to sodium zincate equivalent to 8.1 g zinc oxide, keeping the temperature at 40° C. for ½ hour, diluting threefold with water of 20° C., allowing a precipitate to form overnight, and filtering and drying the residue at 110° C.

The resulting sodium zincosilicate may be used in its own right as a water softener or may be converted by cation exchange into any other desired zincosilicate.

14 Claims, No Drawings

METHOD OF SYNTHESIZING ZINCOSILICATE OR STANNOSILICATE OR TITANOSILICATE MATERIAL

This invention relates to a method of synthesising a zinco-silicate or stannosilicate or titanosilicate material. Such a material can form itself into a zeolitic structure and hence have applications as a base exchange material, water softening agent, extender, catalyst or thixotropic agent.

The material is synthesised in the form of sodium titano-, stanno- or zincosilicate but the sodium is exchangeable, for example by Ca, Mg, Zn, Al, Ni, Ti, Fe, other alkali metals, rare earth, ammonium, hydrogen or organic compounds. Titanium (and possibly calcium, magnesium and zinc) zincosilicate (and possibly titanosilicate and stannosilicate) may be of value as an extender for titanium dioxide in paints whilst zinc zincosilicate and organo zincosilicates may be employed for medicinal or bactericidal purposes.

The materials may be calcined, e.g. to drive off ammonia from ammonium stanno or zincosilicate, for yielding a thermally stable catalyst, possessing good activity due to the vacant exchange sites left in the system by the departed ammonium ions.

However, in its own right the sodium form of the zincosilicate, as a base exchange zeolitic material, has the capability of softening water (by exchanging sodium for the 'hardness' cation) and is therefore a desirable additive in e.g. detergent formulations. Certain sodium zincosilicate materials made by the method according to the invention can selectively take up magnesium with reasonable discrimination even in the presence of calcium. This exchanger may be useful in treating sewage and fish farm effluent, to remove nitrogenous material. These materials are expected to be able to store hydrogen (safely), which may assist the hydrogen economy, and may be able to separate hydrogen isotopes.

Hereafter, for simplicity we refer only to zincosilicate, but this term is to be understood to include stannosilicate, with reference to zinc and zincate reading tin and stannate mutatis mutandis, and likewise for titanosilicate.

According to the invention, a method of synthesising a zincosilicate material comprises mixing an aqueous sodium zincate solution of concentration at least 0.5 M (in ZnO) with a source of silica in the molar ratio silica (as $SiO_2$):sodium zincate (as ZnO) of 3.3:1 to 1:5.5 and maintaining the mixture at a reaction temperature of from 15° C. to 100° C. for at least ¼ hour, diluting the mixture at least twofold (preferably with water of 15° C. to 40° C., upon which an intermediate temperature is obviously reached, a threefold dilution being preferable), allowing a precipitate to form and removing supernatant liquid (e.g. by filtering) and drying the residue preferably at from 30° C. to 200° C.

The source of silica may be solid or liquid, for example powdered glass or a silicate, such as sodium silicate, which may be in solution, e.g. aqueous, preferably of concentration 0.2 to 2.4 M. Thus, in one preferred method, the source of silica is sodium metasilicate pentahydrate solution (preferably at 10–15 g/l) which, when it has been mixed with the sodium zincate solution, is then supplemented by sodium disilicate solution; the source preferably comprises the metasilicate solution and the sodium disilicate solution in the range of ratios (based on $SiO_2$) 1:6 to 1:9, such as 1:7.35.

Where the reaction temperature is high enough (e.g. above 90° C.) it is preferred to maintain the mixture under reflux so that it does not boil dry. The reaction temperature may be 30° C. to 80° C., preferably 40° C., or 80° C. to 100° C. The mixture is preferably held at these temperatures for up to 24 hours, more preferably 20 minutes to 6 hours, for example, for ½ hour.

The silica:zincate ratio is preferably in the range 1:3.5 to 1:5.5 for crystalline product A, and as a guide, A, X and Y structures (described later) may normally be expected at the respective ratios 1:4.5, 1.76:1, 2.37:1.

The sodium zincate is usually prepared in the presence of excess sodium hydroxide, a clear solution being obtained in aqueous sodium hydroxide solutions of concentrations from 5% upwards at elevated temperatures preferably approaching boiling point, by the addition of zinc oxide. Instead of zinc oxide, zinc metal or zinc nitrate may be successfully used, but other zinc salts gave poor results, probably because they depressed the pH.

Lithium, sodium or potassium silicate or quaternary ammonium silicate is preferably employed in an amount sufficient to form a clear solution rather than a colloidal suspension; the molar ratio of silicon calculated as $SiO_2$ with respect to sodium or potassium calculated as the oxide is preferably in the range of from 1.5:1 to 4:1 and with respect to lithium in the range of from 1.5:1 to 20:1 also calculated as the oxide.

The various silicates may be prepared 'in situ' from silica gel, freshly prepared or aged or from natural or precipitated silicas by reaction with the appropriate alkali metal hydroxide or by fusion processes of corresponding alkali metal compound with silica and resultant solution dispersion of the resultant compound with water.

The sodium in the solid may be substituted in the molecule by the metal of a soluble metal salt, e.g. sulphate or nitrate of e.g. calcium, magnesium, copper, zinc, aluminium, nickel, iron, chromium, vanadium, cobalt, maganese, barium and the rare earth metals. In the case of lanthanides, chlorides may also be used. Mixtures or single salts may be employed and the resultant metallo zinco, stanno or titano zeolitic material dried or calcined as required for use in catalysis.

Nickel sulphate for instance may be added to sodium zincosilicate and washed to obtain nickel zincosilicate for use as a reducing catalyst in hydrogenation of unsaturated organic compounds. The same may be done with cobalt. The resulting catalyst can have large surface area and cyclohexane capacity.

The sodium zincosilicate may be further exchanged with a weak acid (organic such as propanoic, or inorganic such as carbonic) to produce the hydrogen form of zincosilicate. For this purpose, acids may be regarded as hydrogen salts.

The sodium zincosilicate may also be exchanged with organic compounds which are sufficiently ionic in character to remove the sodium, yielding the corresponding organic derivative, which may be of potential use where the organic radical ion present renders the material partially soluble or dispersible in polar or nonpolar organic solvents. Examples of such organic compounds are quaternary ammonium compounds, for instance quaternary ammonium amines, which may well be considered as quaternary ammonium salts.

The invention will now be described by way of example.

EXAMPLE 1

Synthesis of crystalline $Na_{1.69}ZnSiO_4$ (i) Sodium metasilicate pentahydrate (6.46 g) was dissolved in 106 g of deionized water (Solution A). 4.18 M sodium zincate ($Na_2ZnO_2$) was prepared by dissolving 49.3 g ZnO in 146.2 g NaOH dissolved in 145 ml of deionized water (Solution B).

(ii) Solution B was transferred to a three-necked, round-bottomed flask and heated at 95° C., under reflux conditions, with constant stirring. Solution A was added slowly to the flask, which was held at 95° C. in a bath, the addition being somewhat exothermic. When the addition was complete sodium disilicate (40.85 g) was added in the same way.

(iii) The flask and contents were refluxed at 95° C. for 4 hours with continuous fast stirring. The contents were then filtered and washed, on a glass sinter, with 500 ml of cold distilled water. The product was then dried at 110° C.

(iv) The yield was 46 g.

EXAMPLE 2

Synthesis of $Na_2Zn_{1.27}SiO_4$

Example 1 was repeated, with the further feature that 100 ml water was added to the flask immediately before step (iii).

The products of Examples 1 and 2 were crystalline, of structure type A (by analogy with aluminosilicates), with a pore size of 4–4½ Å; this restricted size may be why these products are so selective towards magnesium compared with calcium, a most useful property as magnesium hardness in water impairs zeolite efficiency in detergent formulations. Structure A is simple cubic in sodalite (cube-octahedra) units, which are linked by their square faces.

Structures X and Y (of aluminosilictes) differ only in their Si:Al ratios, and have a diamond-related tetrahedral structure, with the sodalite units linked by their hexagonal faces. The pore size is 7.4 Å. With the lowest Si:Al ratios, structure A is formed. On increasing this ratio, mixtures of A+X form. There is then a band of ratios at which just X forms. On further increasing the ratio, there is a band at which Y forms. Mixtures of X and Y are not obtained.

The zincosilicate system of present interest is expected to behave analogously.

In the following Examples 3 to 9, the compositions of the products, reduced to an equivalent basis in $SiO_3$, approximate to $Na_{0.4}Zn_{0.8}SiO_3$ and fall within the range $Na_{0.40-0.58}Zn_{0.72-0.91}SiO_3$. These materials under X-ray examination show no crystallinity, not even of residual ZnO or $SiO_2$. In all cases they are partially hydrated. On differential thermal and thermogravimetric analysis, they appear stable to about 500° C., with smooth water loss.

EXAMPLE 3

Synthesis of $NaZn_{1.5}Si_2O_6$

Sodium zincate was prepared by dissolving 8.1 g zinc oxide in 32.0 g sodium hydroxide dissolved in 50 ml of water. 60.0 g sodium silicate (Pyramid I containing 29.20% $SiO_2$ as colloidal silica) was added to the sodium zincate solution slowly, with constant stirring. The reaction temperature was maintained at 60°–65° C. Reactants were allowed to age at the same temperature for 30 minutes with occasional stirring. The reaction mixture was then poured into 300 ml of warm (40° C.) deionized water and allowed to stand overnight. The product was filtered on a Buchner funnel, washed free from alkali, and dried at 110° C.

EXAMPLE 4

Synthesis of $NaZn_2Si_{2.5}O_{7.5}$

Example 3 was repeated except that the ageing time, instead of being 30 minutes, was 15 minutes.

EXAMPLE 5

Synthesis of $NaZn_{2.1}Si_{2.33}O_{7.0}$

Example 3 was repeated except that the 60.0 g sodium silicate (Pyramid I) was replace by 61.94 g sodium metasilicate pentahydrate, in 50 ml $H_2O$.

EXAMPLE 6

Synthesis of $NaZn_{1.86}Si_{2.37}O_{7.1}$

Example 3 was repeated except that, instead of drying the product at 110° C., it was dried at 60° C.

EXAMPLE 7

Synthesis of $NaZn_{1.4}Si_{1.7}O_{5.2}$

Example 3 was repeated except that the sodium hydroxide, instead of being dissolved in 50 ml water, was dissolved in 150 ml of water (giving 0.54 M sodium zincate).

EXAMPLE 8

Synthesis of $NaZn_{1.76}Si_{2.4}O_{7.3}$

Example 3 was repeated except that the zinc oxide was replaced by a stoichiometrically identical amount of zinc nitrate. When repeating the Example using zinc metal instead of zinc nitrate, similar results were obtained.

EXAMPLE 9

Synthesis of $NaZn_{1.6}Si_{1.8}O_{5.3}$ 320 g sodium hydroxide was dissolved in hot water. 81 g zinc oxide was added, and the mixture heated until a clear solution again resulted (comprising sodium zincate).

Meanwhile 718 g of a sodium silicate solution was prepared, having a 38% solids content with 29% $SiO_2$. Sodium silicate has a ratio $SiO_2:Na_2O$ of 3.3:1. This solution was added to the hot clarified (sodium zincate) solution with stirring. The mixture remained clear, and was heated for 10–15 minutes and quenched by dilution in 2–3 times its volume of cold water. A white flocculant precipitate resulted.

This precipitate was filtered, washed free of excess sodium hydroxide solution, and dried to a white fluffy powder in an oven at 130° C.

The $Na_2O$ content can be exchanged with most metallic ions which are capable of possessing water-soluble salts, e.g. Ni, Co, Cr, Cu and rare earths. Also, both Ca and Mg hardness in water can be removed.

The uptake of magnesium by the products of each of these examples was determined. The units of uptake in the following table are milli-equivalents of $Mg^{++}$ per gram of product.

| Example After: | 1 day | 2 days | 3 days | 7 days |
|---|---|---|---|---|
| 1 | 3.09 | 3.38 | 3.86 | 3.57 |
| 2 | 3.60 | 3.73 | 4.16 | 4.06 |
| 3 | 1.33 | 1.43 | 1.77 | 1.42 |
| 4 | 1.40 | 1.13 | 1.65 | 1.46 |

-continued

| Example After: | 1 day | 2 days | 3 days | 7 days |
|---|---|---|---|---|
| 5 | 1.38 | 1.27 | 1.51 | 1.29 |
| 6 | 1.35 | 1.27 | 1.80 | 1.31 |
| 7 | 1.39 | 1.34 | 1.80 | 1.47 |
| 8 | 1.29 | 1.30 | 1.78 | 1.35 |
| 9 | 1.18 | 1.16 | 1.64 | 1.27 |

By comparison, the calcium uptake (same units) on the product of Example 1 was 0.37–0.40 after 1 day and 0.65 after 7 days, and for the other Examples after 1 day was:

| Example: | 2 | 3 | 4 | 5 | 6 | 7 | 8 | 9 |
|---|---|---|---|---|---|---|---|---|
| Uptake: | 0.46 | 0.97 | 1.06 | 0.90 | 1.10 | 0.97 | 0.81 | 1.06 |

In Illustration 1, the effect of adding differing amounts of sodium silicate to sodium zincate in the general method of Examples 3–9 is illustrated:

ILLUSTRATION 1

The following amounts of sodium silicate were added to a reaction mixture of 8.1 g ZnO + 32 g NaOH at 62° C.–65° C. Reaction time was 30 minutes.

| Mass sodium silicate added (g) | yield (g) | % $H_2O$ | Filtrate g ZnO | Filtrate g $SiO_2$ | Solid g ZnO | Solid g $SiO_2$ |
|---|---|---|---|---|---|---|
| 40 | 8.3 | 11.90 | 3.14 | 5.41 | 3.63 | 2.51 |
| 60 | 10.3 | 11.56 | 2.18 | 8.70 | 4.76 | 3.54 |
| 70 | 12.8 | 15.77 | 1.01 | 7.90 | 4.09 | 4.38 |
| 80 | 13.7 | 11.85 | 1.69 | 11.25 | 5.51 | 4.87 |

Discrepancies in balancing are due to analytical difficulties.

The solids thus had compositions in the range 0.93–1.45 ZnO/$SiO_2$ all partially hydrated. The best yield, in terms of calcium exchange capacity, was given by the 60 g addition. Not all the silica or zinc are used up in the reaction, whatever the proportions used.

ILLUSTRATION 2

Copying Illustration 1, with the 60 g addition, the reaction temperature was varied, and its effect illustrated on calcium uptake (units: milli-equivalents Ca/g sodium zincosilicate).

| Reaction Temp. | Yield g | % $H_2O$ | $Ca^{2+}$ uptake meq/g |
|---|---|---|---|
| 40 | 12.9 | 9.60 | 1.47 |
| 50 | 12.2 | 8.25 | 1.35 |
| 60 | 14.3 | 9.77 | 1.33 |
| 70 | 12.6 | 5.91 | 1.17 |
| 80 | 14.3 | 5.25 | 1.08 |

ILLUSTRATION 3

Copying Illustration 2, with the 40° C. reaction temperature, the reaction times were varied.

| Time (hours) | Yield (g) | % $H_2O$ | $Ca^+$ uptake (meq/g) | $Na^+$ released (meq/g) |
|---|---|---|---|---|
| ¼ | 13.15 | 9.58 | 1.35 | 1.46 |
| ½ | 13.40 | 9.10 | 1.37 | 2.08 |
| 1 | 14.10 | 9.38 | 1.36 | 2.13 |
| 2 | 12.00 | 5.98 | 1.09 | 0.95 |
| 4 | 13.35 | 7.45 | 1.34 | 1.01 |
| 6 | 13.60 | 9.73 | 1.30 | 1.08 |
| 8 | 14.20 | 13.21 | 1.49 | 1.10 |
| 16 | 16.3 | 9.62 | 1.63 | 0.95 |
| 24 | 18.6 | 10.64 | 2.4 | 0.97 |

ILLUSTRATION 4

Copying Illustration 3, with the ½ hour reaction time, the effect on the exchange capacity of sodium zincosilicate of different ageing times all at 40° C. is illustrated. (In a separate test, the ageing of sodium zincate and sodium silicate solutions prior to mixing was found to make no difference.)

| Ageing time (hours) | Yield (g) | % $H_2O$ | $Ca^+$ uptake (meq/g) | $Na^+$ released (meq/g) |
|---|---|---|---|---|
| ¼ | 11.1 | 7.98 | 1.22 | 0.90 |
| ½ | 12.0 | 8.28 | 1.22 | 1.00 |
| 1 | 11.1 | 6.82 | 0.85 | 0.79 |
| 2 | 12.3 | 8.80 | 1.19 | 0.88 |
| 4 | 11.5 | 6.93 | 0.98 | 0.87 |
| 6 | 11.7 | 6.45 | 0.70 | 0.82 |
| 8 | 11.6 | 6.37 | 0.87 | 0.79 |
| 16 | 11.4 | 6.49 | 0.70 | 0.82 |
| 24 | 12.3 | 6.27 | 0.72 | 0.89 |

ILLUSTRATION 5

Copying Illustration 3 (½ hour reaction time), the effect of varying the composition of the 'sodium zincate' is illustrated.

| Wt. of NaOH (g) | Yield (g) | % $H_2O$ | $Ca^{2+}$ uptake (meq/g) | $Na^+$ released (meq/g) |
|---|---|---|---|---|
| 24 | 18.0 | 6.90 | 0.98 | 1.08 |
| 28 | 14.8 | 6.40 | 0.97 | 0.97 |

Thus, where stoichiometric sodium zincate is $Na_2ZnO_2$ (≡32 g NaOH=0.8 M on the above basis), deviations within the concentration range 0.6 M to 0.8 M are deduced to be acceptable.

ILLUSTRATION 6

Copying Illustration 3 (½ hour reaction time), the effect of different temperatures for drying the sodium zincosilicate gel is illustrated. The drying time in each case was 16–18 hours.

| Drying temp. for gel (°C.) | Yield (g) | % $H_2O$ | $Ca^{2+}$ uptake (meq/g) | $Na^+$ released (meq/g) |
|---|---|---|---|---|
| 20 | 18.0 | 16.49 | 1.76 | 1.32 |
| 40 | 11.0 | 10.18 | 0.98 | 0.97 |
| 60 | 12.0 | 11.95 | 1.35 | 1.17 |
| 80 | 13.5 | 8.68 | 1.22 | 1.12 |

The 20° C. product is the only one in this series of Illustrations not to be a good (free-flowing) granular material.

An idealisation of the products of Examples 1 and 2 is to regard them as $Na_2ZnSiO_4$. They are crystalline (but the crystallinity is destroyed on heating to 250° C.).

On leaching all these products for 10 days with sodium chloride solution, no trace of zinc was found in the eluates. On their being subjected to gamma irradiation, no obvious decomposition was detected.

We claim:

1. A method of synthesising a zincosilicate, stannosilicate or titanosilicate, comprising mixing an aqueous sodium zincate, stannate or titanate solution of concentration at least 0.5 M (in ZnO, SnO or TiO) with a source of silica in the molar ratio silica (as $SiO_2$):sodium zincate, stannate or titanate (as ZnO, SnO or TiO) of 3.3:1 to 1:5.5 and maintaining the mixture at a reaction temperature of from 15° C. to 100° C. for at least ½ hour, diluting the mixture at least twofold, allowing a precipitate to form and removing supernatant liquid therefrom and drying the residue.

2. A method according to claim 1, wherein the source of silica is a silicate.

3. A method according to claim 2, wherein the source of silica is an aqueous solution of sodium metasilicate pentahydrate.

4. A method according to claim 3, wherein the sodium metasilicate solution is of a concentration from 10 to 15 g/l.

5. A method according to claim 3, wherein the source of silica further comprises sodium disilicate solution, which is added after the sodium metasilicate solution has been mixed with the sodium zincate stannate or titanate solution.

6. A method according to claim 5, wherein the ratio of metasilicate:disilicate in the source of silica is from 1:6 to 1:9.

7. A method according to claim 1, wherein the reaction temperature is from 30° C. to 80° C.

8. A method according to claim 1, wherein the reaction temperature is from 80° C. to 100° C.

9. A method according to claim 1, wherein the mixture is maintained at the reaction temperature for a duration of up to 24 hours.

10. A method according to claim 9, wherein the said duration is from 20 minutes to 6 hours.

11. A method according to claim 1, wherein the silica:zincate, stannate or titanate ratio is 1:3.5 to 1:5.5.

12. A method according to claim 1, wherein the dilution of the mixture is with water of a temperature of 15° C. to 40° C.

13. A method of synthesising a substituted zincosilicate, stannosilicate or titanosilicate, comprising making sodium zincosilicate, stannosilicate or titanosilicate by the method according to claim 1 and contacting it with a non-sodium salt until the non-sodium cation exchanges with the sodium.

14. A method of making catalyst or catalyst support comprising making a zincosilicate, stannosilicate or titanosilicate by the method according to claim 13, and calcining it.

* * * * *

UNITED STATES PATENT AND TRADEMARK OFFICE
CERTIFICATE OF CORRECTION

PATENT NO. : 4,329,328
DATED : May 11, 1982
INVENTOR(S) : McANESPIE ET AL

It is certified that error appears in the above—identified patent and that said Letters Patent is hereby corrected as shown below:

In column 1, line 6, "synthesising" should read --synthesizing--;

In column 1, line 12, "synthesised" should read --synthesized--;

In column 1, line 45, "synthesising" should read --synthesizing--;

In column 2, line 41, "maganese" should read --manganese--;

In column 3, line 37, "aluminosilictes" should read --aluminosilicates--;

In column 4, line 13, "replace" should read --replaced--;

UNITED STATES PATENT AND TRADEMARK OFFICE
CERTIFICATE OF CORRECTION

PATENT NO. : 4,329,328

DATED : May 11, 1982

INVENTOR(S) : McANESPIE ET AL

It is certified that error appears in the above—identified patent and that said Letters Patent is hereby corrected as shown below:

In column 7, line 12, "synthesising" should read --synthesizing--;

In column 7, line 19, "½" should read --¼--;

In column 8, line 2, after "zincate" there should be a comma; and

In column 8, line 22, "synthesising" should read --synthesizing--.

Signed and Sealed this

Twenty-first Day of September 1982

[SEAL]

Attest:

Attesting Officer

GERALD J. MOSSINGHOFF

Commissioner of Patents and Trademarks